(12) United States Patent
Darraba (10) Patent No.: US 8,010,255 B2
(45) Date of Patent: Aug. 30, 2011

(54) MOVABLE OR REMOVABLE SEAT FOR A MOTOR VEHICLE

(75) Inventor: Roger Darraba, Montesson (FR)

(73) Assignee: Autoliv Development AB, Vargarda (SE)

( * ) Notice: Subject to any disclaimer, the term of this patent is extended or adjusted under 35 U.S.C. 154(b) by 623 days.

(21) Appl. No.: 10/556,549

(22) PCT Filed: May 7, 2004

(86) PCT No.: PCT/SE2004/000703
§ 371 (c)(1),
(2), (4) Date: Dec. 28, 2006

(87) PCT Pub. No.: WO2004/098943
PCT Pub. Date: Nov. 18, 2004

(65) Prior Publication Data
US 2007/0102999 A1   May 10, 2007

(30) Foreign Application Priority Data
May 9, 2003 (GB) .................................. 0310723.2

(51) Int. Cl.
*B60R 22/00* (2006.01)
(52) U.S. Cl. .................. 701/45; 701/1; 701/4; 701/120; 701/301; 342/33; 342/30; 342/455
(58) Field of Classification Search .............. 701/45, 701/1, 4, 13, 29, 120, 300, 301; 342/29, 342/30, 33, 455, 357.08
See application file for complete search history.

(56) References Cited

U.S. PATENT DOCUMENTS

| 4,334,428 A | | 6/1982 | Fima et al. | |
|---|---|---|---|---|
| 4,578,992 A | * | 4/1986 | Galasko et al. | 73/146.5 |
| 4,823,110 A | * | 4/1989 | Dorward et al. | 340/391.1 |
| 5,144,235 A | * | 9/1992 | Glover et al. | 324/309 |
| 5,515,933 A | * | 5/1996 | Meyer et al. | 180/273 |
| 5,618,056 A | | 4/1997 | Schoos et al. | |
| 5,619,431 A | * | 4/1997 | Oda | 702/150 |
| 5,696,409 A | * | 12/1997 | Handman et al. | 307/10.1 |
| 5,851,026 A | | 12/1998 | Schoos et al. | |

(Continued)

FOREIGN PATENT DOCUMENTS
DE     40 06 885 A1    10/1990
(Continued)

*Primary Examiner* — Mark Hellner
*Assistant Examiner* — Redhwan Mawari
(74) *Attorney, Agent, or Firm* — Brinks Hofer Gilson & Lione (57) ABSTRACT

A movable or removable seat for a motor vehicle is disclosed which preferably takes the form of a re-movable vehicle seat (1). The removable seat incorporates a first inductor (17) which forms part of an inductive coupling between the removable seat and a second inductor (21) which is mounted on the motor vehicle. The first inductor forms part of a resonant circuit which incorporates at least one capacitor. The resonant frequency of the resonant circuit is variable in response to a sensed parameter such as, for example, the position of a head-rest of the seat, the inclination of the back-rest of the seat and such like. A central unit (23) generates a square wave which excites the resonant circuit. A signal is transmitted from the resonant circuit to the central unit (23) which analyses the resonant frequency of the resonant circuit.

16 Claims, 5 Drawing Sheets

U.S. PATENT DOCUMENTS

| | | | |
|---|---|---|---|
| 6,008,547 A | 12/1999 | Dobler et al. | |
| 6,255,790 B1 * | 7/2001 | Popp et al. | 318/280 |
| 6,556,401 B1 * | 4/2003 | Loewen et al. | 361/91.1 |
| 6,585,338 B2 * | 7/2003 | Harris | 331/4 |
| 6,882,162 B2 * | 4/2005 | Schirmer et al. | 324/656 |

FOREIGN PATENT DOCUMENTS

| | | |
|---|---|---|
| GB | 1 301 359 | 12/1972 |
| GB | 2 195 183 A | 3/1988 |
| GB | 2 337 335 A | 11/1999 |
| WO | WO 03/024749 A1 | 3/2003 |

* cited by examiner

MOVABLE OR REMOVABLE SEAT FOR A MOTOR VEHICLE

CROSS REFERENCE TO RELATED APPLICATIONS

This application claims priority to Great Britain patent application 0310723.2, filed May 9, 2003 and PCT/SE2004/000703, filed May 7, 2004.

FIELD OF THE INVENTION

THE PRESENT INVENTION relates to a movable or removable seat for a motor vehicle.

BACKGROUND OF THE INVENTION

Many vehicles are presently manufactured which are provided with one or more removable seats. The seats may be removed from the vehicle should the driver of the vehicle wish, for example, to carry a large or bulky load. Also vehicles are provided with movable seats, to permit the seat position to be adjusted, and other movable components, such as pillar-loop height adjusters for safety-belts.

There is often a requirement for a vehicle seat to incorporate one or more sensor switches which are utilised to control safety devices intended to provide protection for an occupant of the seat in the event that an accident should occur. For example there may be a requirement for a weight-sensitive switch which indicates the presence of an occupant on the seat. Also there may be a requirement for a buckle switch to sense whether the occupant of the seat is, or is not, using a safety-belt. Signals derived from such switches may be essential for the proper control of the deployment of a safety device such as an air-bag. Many other types of switches may be provided to sense parameters relating to the seat and/or the occupant of the seat in very sophisticated cases.

If a vehicle seat is permanently fixed in position, each switch can be connected by fixed wiring to a central control unit which is utilised to control the deployment of safety devices within the vehicle. It is preferred that for diagnostic purposes a resistor should be connected in parallel with the switch so that the status of the wires can be checked from time-to-time without the switch being closed. Thus the resister creates a resistance valve in the switch circuit which can be measured as indicating the proper connection with the circuit despite the switch being in an open condition.

If, however, the vehicle seat is to be a removable seat, it is not possible to utilise fixed wiring between sensor switches within the seat and the central control unit. Whilst, it would be possible to provide a wiring arrangement involving a connector to be connected and disconnected each time the seat is placed in the vehicle or removed from the vehicle, an arrangement of this type is not preferred, since users of the vehicle may well forget to effect the necessary connections. It is, consequently, preferred to use a contactless-transmission of information relating to the status of switches within the seat using, for example, an inductive coupling in the form of a transformer. Even if a vehicle seat is a conventional adjustable seat it may be preferred to use some sort of wireless connection between the seat and the vehicle. For a component such as a pillar-loop with a height adjuster, which may have a sensor to sense the height of the loop, it may be difficult to make a permanent wiring connection when installing the pillar-loop, and again a wireless connection to a sensor in such a pillar-loop may be preferred.

Here it is to be understood that when a switch is provided with a resistor in parallel for diagnostic purposes as described above, what is sensed when the switch is closed is effectively a change in resistance. The circuit goes from a high resistance circuit, with a resistance value equivalent to that of the nominal value of the resistor that is in parallel with the switch to a low resistance circuit.

If there is, however, a contactless-transmission within the circuit as constituted, for example, by a transformer, the coupling factor of the transformer will effect the measured value of the resistance of the circuit. Where, for example, a transformer is constituted by two parts, one being a part on a seat and one being part on the motor vehicle, the actual value of the coupling factor may be unpredictable, and the coupling factor may be relatively low. It is thus very difficult to determine accurately the resistance of the combination of a switch and resistor in a motor vehicle seat when there is a contactless-transmission between the seat and a central control unit.

The present invention seeks to provide an improved movable or removable seat for a motor vehicle.

SUMMARY OF THE INVENTION

According to the present invention there is provided a removable seat for a motor vehicle, wherein the seat incorporates a first inductor to form part of an inductive coupling between the unit and a second inductor mounted on the motor vehicle, the first inductor forming part of a resonant circuit which incorporates at least one capacitor, the resonant frequency of the resonant circuit being variable in response to a sensed parameter.

Advantageously, the variable parameter is the position of a height-adjustable belt deflector.

Conveniently, the parameter is the position of a head-rest.

Preferably, the parameter is the inclination of a back-rest.

Advantageously, the parameter is the condition of part of a safety-belt system.

Conveniently, the parameter is a condition of a safety-belt retractor.

Preferably, the parameter is a condition of a safety-belt buckle.

Advantageously, the parameter is weight applied to the squab of the seat.

Conveniently, the resonant circuit includes at least one capacitor associated with a switch to switch the capacitor in and out of the circuit.

Preferably, the seat incorporates a plurality of capacitors each with a respective switch to enable the capacitors to be switched individually in and out of the circuit.

Advantageously, the resonant circuit is a passive circuit.

Conveniently, the seat is provided in combination with a vehicle, the vehicle being provided with said second inductor to co-operate with the first inductor to form a contactless-transmission, the second inductor being associated with a signal generator and analyser to generate an exciting signal to excite the resonant circuit and to analyse signals from the resonant circuit.

Preferably, the resonant circuit has two resonant frequencies depending upon the condition of a switch, and the signal generator is configured to generate a signal such that the circuit has resonant frequencies which are odd harmonics of the base frequency of the generated signal.

Advantageously, the signal generator is adapted to generate a plurality of separate signals, each signal having a different frequency which is a possible resonant frequency of the circuit.

The separate signals may all be generated simultaneously, but conveniently, the signal generator is configured to generate successive signals of different possible resonant frequencies.

In one embodiment, the signal generator and analyser is configured to generate a signal during one period of time and analyse a signal during a succeeding period of time. In one embodiment the unit is configured to take an average of the analysed signals and compare the phase of the coverage with the phase of the signal generated by the signal generator.

Alternatively the signal generator and analyser may be configured to generate a signal and analyse a signal simultaneously.

BRIEF DESCRIPTION OF THE DRAWINGS

In order that the invention may be more readily understood, and so that further features thereof may be appreciated, embodiments of the invention will now be described, by way of example, with reference to the accompanying drawings in which.

DETAILED DESCRIPTION OF THE INVENTION

Figure 1:
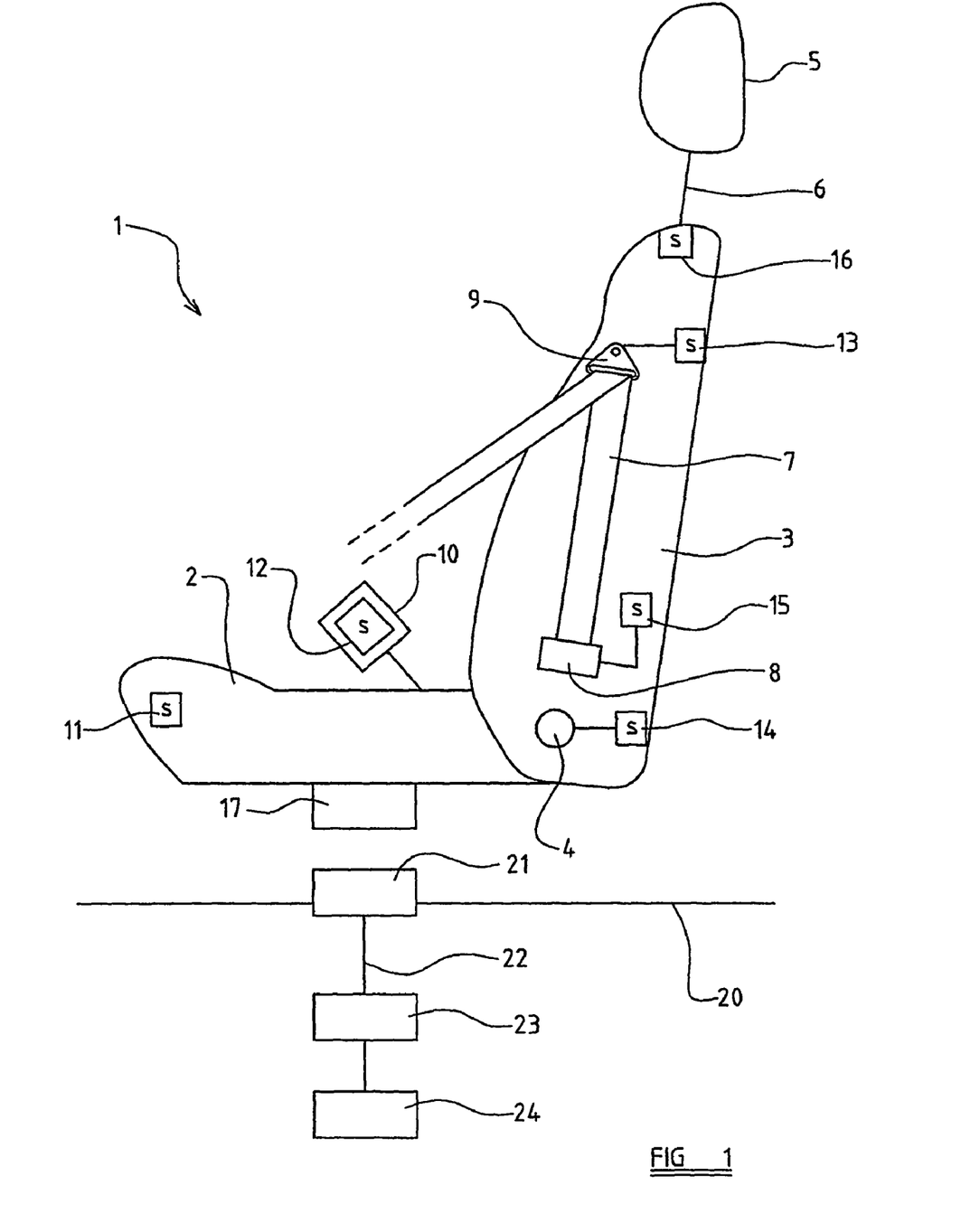
FIG. 1 is a diagrammatic view of a vehicle seat and part of a vehicle.

Referring initially to FIG. 1 of the accompanying drawings, a vehicle seat 1 is illustrated, the seat being in the form of a removable seat which can be removed from and re-mounted in a motor vehicle by the driver of the vehicle. The seat includes a squab 2 or seat cushion and a back-rest 3. The back-rest 3 is pivotable relative to the squab 2 about an axis 4. The back-rest 3 carries a head-rest 5. The head-rest 5 is connected to the back-rest by means of a supporting arm 6. The position of the head-rest 5 may be adjusted by moving the supporting arm 6 upwardly and downwardly.

The seat 1 is provided with a seat-belt 7, the seat-belt 7 being mounted on a retractor reel 8. Part of the safety-belt 7 passes through an adjustable-height loop deflector 9. A buckle 10 is provided to receive a tongue provided on the safety-belt.

Various sensor switches are provided within the seat 1. A first sensor switch 11 is mounted within the squab 2 of the seat and is a weight-responsive sensor switch. The switch 11 is thus closed when an occupant is seated on the seat 1.

The buckle 10 incorporates a switch 12 which is closed when the seat-belt tongue is inserted in the buckle 10, thus showing that the occupant of the seat is wearing the seat-belt 7.

The adjustable-height loop deflector 9 is provided with a sensor switch 13 which is closed in an appropriate manner to indicate the height of adjustment of the loop-deflector. The back-rest 3 is provided with a sensor switch 14 responsive to the degree of inclination of the back-rest 3 relative to the squab 2. The retractor 8 is provided with a sensor switch 15 which is closed in dependence along the length of safety-belt withdrawn from the retractor. The head-rest 5 is associated with a sensor switch 16 which is closed in dependence upon the degree of movement of the head-rest.

Whilst reference has been made to many simple switches, it is to be appreciated that many of the described switches may be replaced by sensors which, instead of providing a simple "on-off" output, provide a gradually increasing output, as will be described hereinafter in greater detail.

The seat 1 is provided with an inductor 17 and, as will be described hereinafter, the various switches and sensors are provided in a circuit which incorporates the inductor 17.

FIG. 1 also illustrates part of the floor 20 of a motor vehicle on which the seat 1 is to be mounted. The floor 20 is provided with an inductor 21 which is to co-operate with the inductor 17 provided on the seat, to form a transformer or a contact-less-transmission arrangement extending between the seat and the vehicle. The inductor 21 is connected by means of a wire 22 to a central control unit 23. The control unit 23 is configured to control deployment of various safety devices, such as the safety device 24.

Figure 2:
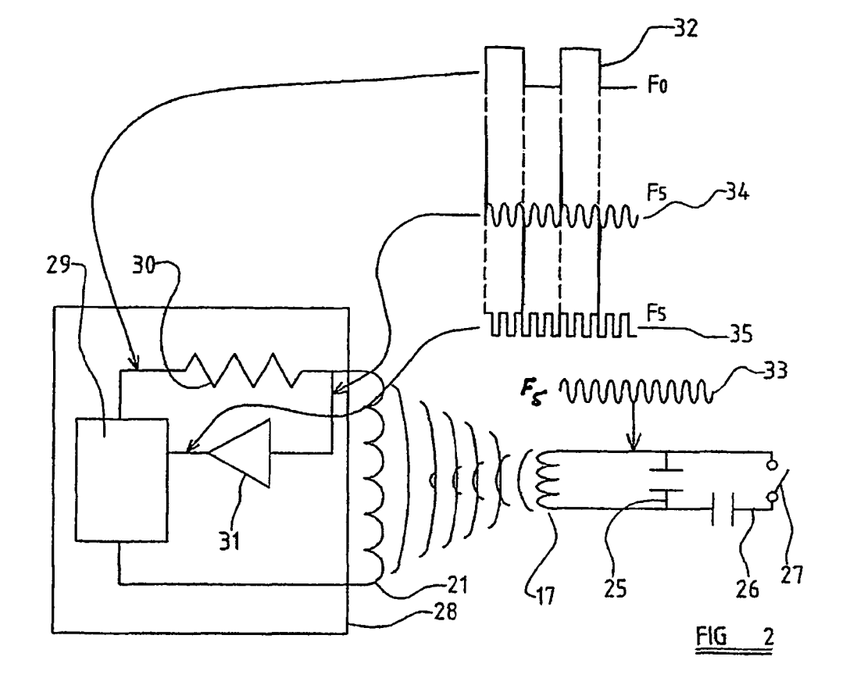
FIG. 2 is a sensor circuit diagram together with some wave forms illustrating features of one seat in accordance with the invention.

FIG. 2 illustrates, schematically, sensor circuitry present within the vehicle and within the seat, but, for the sake of simplicity, the circuitry in the seat only includes one sensor switch.

Figure 3:
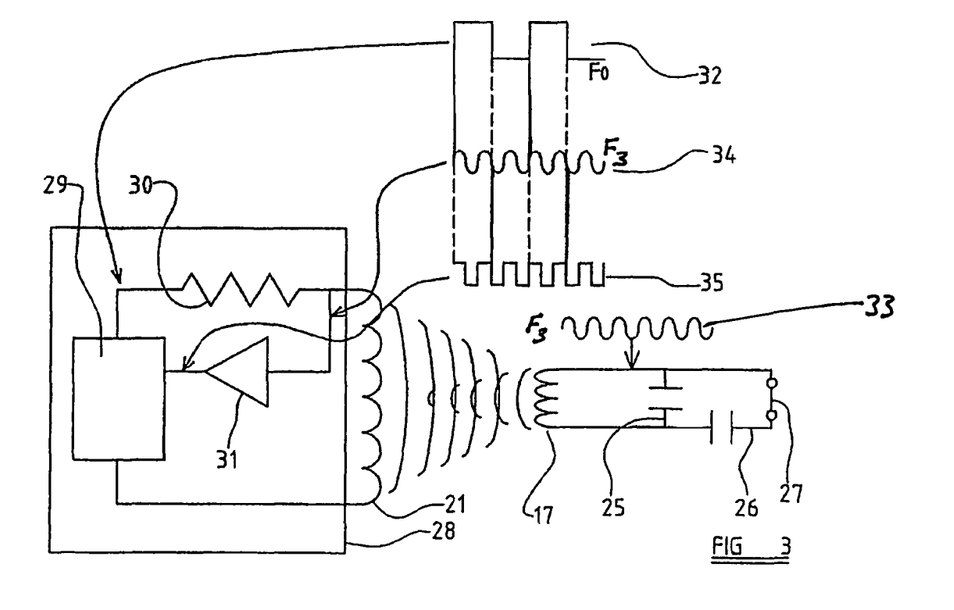
FIG. 3 is a view corresponding to FIG. 2, but with alternate wave forms.

Considering FIG. 2 in more detail showing a sensor circuit 18 in accordance with this invention, the inductor 17 which is present on the seat 1 forms part of a tuned resonant circuit, the circuit including a first capacitor 25 connected in parallel with the inductor 17, and also including the series connection of a second capacitor 26 and a switch 27 connected in parallel with the combination of the inductor 17 and the first capacitor 25. The switch 27 is thus effective in switching the second capacitor 26 in (as shown in FIG. 3) and out (as shown in FIG. 2) of the resonant circuit depending upon whether the switch 27 is open or closed.

It will be appreciated that the sensor circuit 18 shown in FIG. 2 is such that with the switch 27 open, a resonant circuit is formed having a frequency determined by the inductance L1 for the inductor 17 and the capacitance of the capacitor 25. However, when the switch 27 is closed, the circuit 18 will have a second resonance frequency determined by the inductance L1 and the combination of the capacitors 25 and 26.

FIG. 2 also illustrates the inductor 21 provided on the floor 20 of the motor vehicle and shows a signal processing circuit 28 that is connected to the inductor 21. The signal processing circuit 28 may be located immediately adjacent the inductor 21 with the output of that circuit being connected to the central control unit 23, or alternatively the signal processing circuit 28 may form part of the central control unit 23.

The signal processing circuit 28 incorporates a signal generator and signal analyser 29. The signal generator and analyser 29 is connected, together with a resistor 30, in circuit with the inductor 21. Also connected in circuit with the inductor 21 is a pulse-shaper 31, for example in the form of a Schmidt trigger circuit which is connected to convert sinusoidal waves present within the inductor 21 into a square pulse-wave.

The signal generator and analyser 29 is adapted to generate a square wave current signal having a frequency F0 as shown at 32. The square wave is transmitted inductively from the inductor 21 to the inductor 17, and thus excites the resonant circuit. The resonant circuit resonates with a voltage frequency $F_5$ as shown at 33. The voltage curve is almost a pure sine wave. Signals from the resonant circuit are transmitted back from the inductor 17 to the inductor 21. Signals are passed from the inductor 21 to the signal shaping circuit 31. The input 34 to the signal shaping circuit is a sine wave voltage equivalent to the signal 33 but with added spikes generated whenever there is a change of polarity of the square wave 32. The signal 33 is shaped by the signal-shaping circuit 31 to provide a square wave 35 that has the frequency $F_5$ of the fifth harmonic of the square wave $F_O$. This wave 35 is analysed by the signal generator and analyser 29.

Here it is to be noted that in the described embodiment with the switch 27 open, the resonant frequency of the resonance circuit provided within the vehicle seat is the fifth harmonic $F_5$ of the frequency F0, whereas with the switch 27 closed (as illustrated in FIG. 3), the resonant frequency of the circuit in the seat is the third harmonic $F_3$ of the frequency F0.

Thus, with the switch 27 closed, as in FIG. 3, the frequency of the signals 33, 34 and 35 are all $F_3$, the third harmonic of the originally generated square wave signal 32.

It is thus to be understood that in operation of the sensor circuit 18 illustrated in FIGS. 1 and 2, the signal generator and analyser 29 will initially generate the square wave F0 which will be transmitted from the inductor 21 to the inductor 17 which will cause the resonant circuit to resonate. The circuit 18 will resonate at an appropriate resonant frequency depending upon whether the switch 27 is open or closed. If the switch is open (as illustrated in FIG. 2), the resonant circuit resonates at the fifth harmonic $F_5$ of the frequency F0. A signal will be transmitted from the inductor 17 to the inductor 21, and that signal will be shaped by the shaping circuit 31 with a resultant square wave being fed to the signal generator and analyser 29. The signal generator and analyser 29 will be able to determine whether the received signal is the third harmonic (FIG. 3) or the fifth harmonic (FIG. 2) of the frequency F0, and will thus be able to determine whether the switch 27 is opened or is closed.

It is thus to be appreciated that the arrangement disclosed enables the condition of the switch to be sensed, but also enables a diagnostic check of the relevant circuitry to be carried out.

Figure 4:
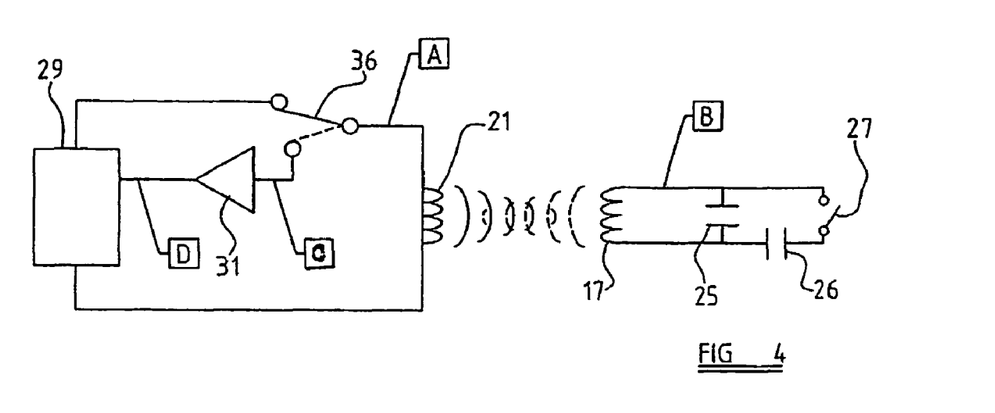
FIG. 4 is a view corresponding to FIG. 2, but illustrating a modified embodiment of the invention.

FIG. 4 is a figure provided for explanatory purposes. The circuitry shown in FIG. 4 is generally equivalent to that shown in FIG. 2 save that a controllable switch 36 is provided connected between one end of the inductor 21, the signal generator and analyser 29, and the pulse-shaping circuit 31. Various points on the sensor circuit 18 are identified by letters A to D.

Figure 5:
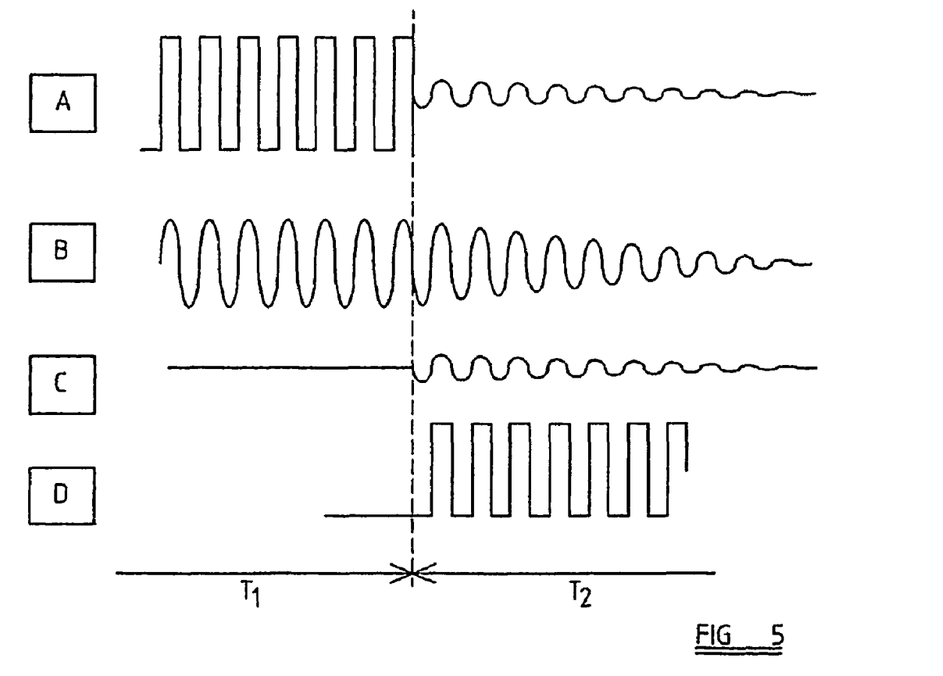
FIG. 5 is a view illustrating wave forms associated with the sensor circuit of FIG. 4.

FIG. 5 is a graphical figure illustrating the wave forms present at the points A to D in operation of the circuit 18 during two periods of time T1 and T2. During the first period of time T1, the signal generator and analyser 29 is actually transmitting a signal, and the switch 36 is connected to the resistor 30, whereas in the subsequent period of time T2 the signal generator and analyser 29 is analysing signal and the switch 36 is connected to the pulse-shaping circuit 31.

Initially, when the signal generator and analyser 29 is generating a square-wave outlet signal at a frequency F0, as can be seen at point A, which is one of the leads to the inductor 21, there is a strong square-wave. At point B which is part of the resonant circuit mounted in the seat, there is a strong sinusoidal wave. At point C, which is the input to the shaping circuit 31, there is no signal and at point D, which is the output of the shaping circuit 31, there is again no signal. At the end of time T1, the condition of the switch 36 is changed and the signal generator and analyser 29 commences an analysing function. At the beginning of the time T2, there is a still strong sinusoidal wave present at point B within the resonant circuit mounted on the seat. This wave does, however, decay with time. This wave is inductively coupled from the inductor 17 to the inductor 21 and, as can be seen, at point A there is a somewhat smaller, but no less discernible sinusoidal wave form which again decays with time. It can be seen that as the switch 36 is now connected to the input of the shaping circuit 31, the wave form at point C is essentially identical to the wave form at point A. The output of the shaping circuit 31 is a square wave form which facilitates analysis of the signal by the signal analyser 29.

Figure 6:
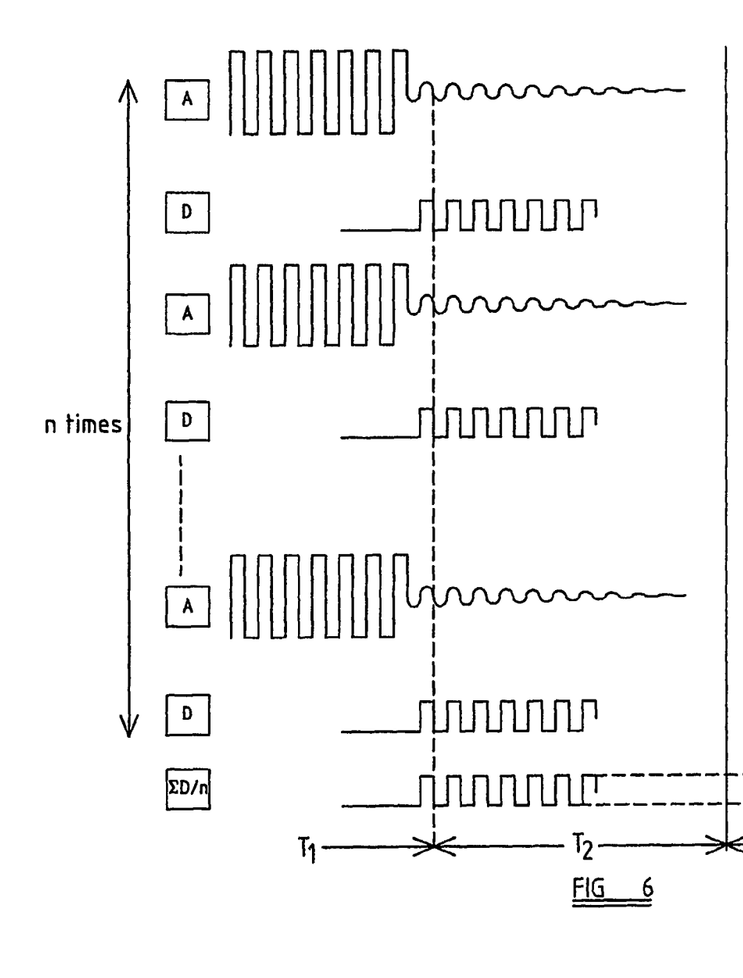
FIG. 6 is a further view illustrating wave forms associated with the sensor circuit of FIG. 6.

Turning to FIG. 6, it can be seen that the signal transmission and signal analysis procedures may be completed many times. As can be seen, the phase of the square-wave signal at point D as generated by the shaping circuit 31 is typically in phase with the immediately preceding signal at point A as generated by the signal generator and analyser 29. Successive signals over n cycles of operation may be averaged, and the average signal, on being compared with the original square wave, is in phase with the original square wave.

Figure 7:
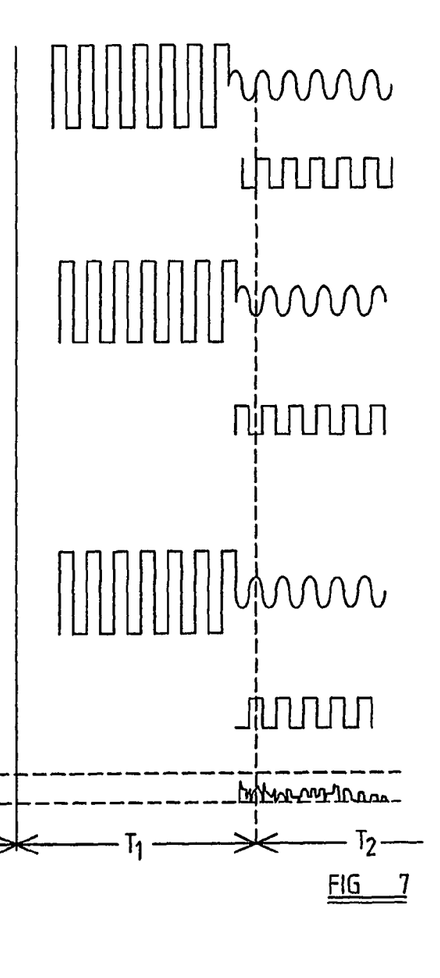
FIG. 7 is an alternative view illustrating wave forms for purposes of comparison.

In FIG. 7 the same procedure is repeated, but the resonant circuit is not present and a spurious signal is present. It can be seen that the averaged analysed signal is not in phase with the original square wave. Indeed, the averaged signal is little more than "noise". The signal generator and analyser 29 is thus adapted to compare the phase of the received signal from the shaping circuit 31 with the phase of the recently transmitted signal. This helps identify any spurious signals from external perturbations.

In a variant of the above-described invention, it is envisaged that the signal generator and analyser 29 could be configured to generate a separate wave for each possible resonant frequency of the resonant circuit. These separate waves could be generated successively.

Figure 8:
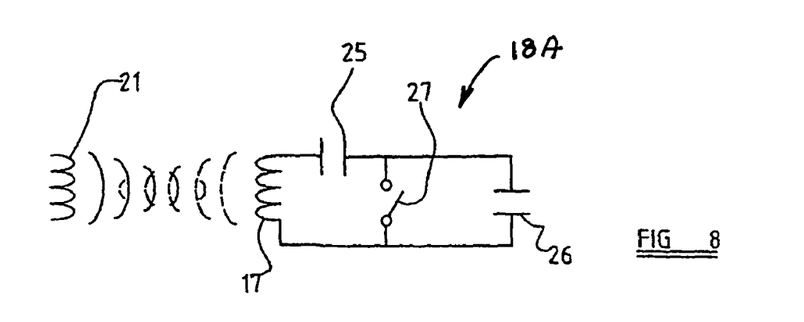
FIG. 8 illustrates a modification of part of the sensor circuit of FIGS. 2, 3 and 4.

Whilst the invention has been described with reference to one particular form of resonant circuit 18, it is to be appreciated that many different types of resonant circuit may be utilised. FIG. 8, for example, shows a modified sensor circuit 18A in which the inductor 17 is connected to a series connection of the two capacitors 25 and 26, with one of the capacitors 26 being effectively shorted out by the switch 27. The switch 27 therefore again permits the capacitor 26 to be switched in or out of the resonant circuit. Of course, many other configurations of resonant circuit may be utilised.

Figure 9:
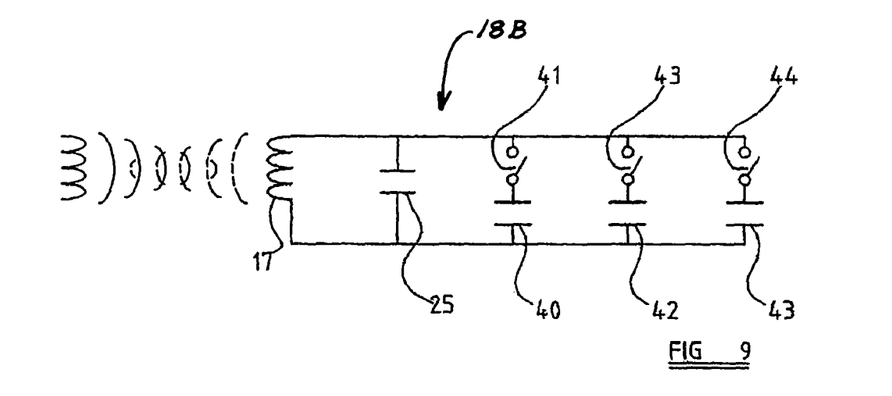
FIG. 9 is a view corresponding to FIG. 7 showing a further modification.

So far the description has only concentrated on one switch whereas, in FIG. 1, it was shown that a single seat may incorporate a large number of switches. FIG. 9 illustrates a sensor circuit 18B where the inductor 17 is connected in a resonant circuit which incorporates a first capacitor 25, and which additionally includes a number of individually switched supplementary capacitors including a capacitor 40 with an associated switch 41, a capacitor 42 with an associated switch 43 and a capacitor 43 with an associated switch 44. The value of the capacitors will be chosen so that regardless of the combination of switches which are closed, a clearly identifiable resonant frequency will be achieved. It is to be understood that any number of capacitors may be present in a circuit of this type.

Figure 10:
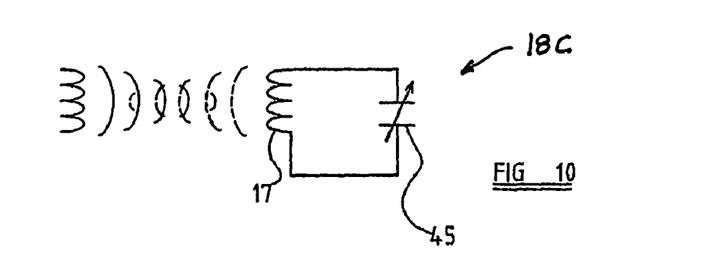
FIG. 10 is a view corresponding to FIG. 7 showing a further modification.

FIG. 10 illustrates a sensor circuit 18C in which the inductor 17 is associated with a single capacitor 45, that capacitor being a variable capacitor. A variable capacitor may be used in place of the switch 14, for example, with the capacitance of the capacitor being adjusted in accordance with the degree of rake at the back of the seat. The variable capacitor 45 may be used also, for example, in place of the switch 13 which was associated with the height adjustable deflector loop 9.

Figure 11:
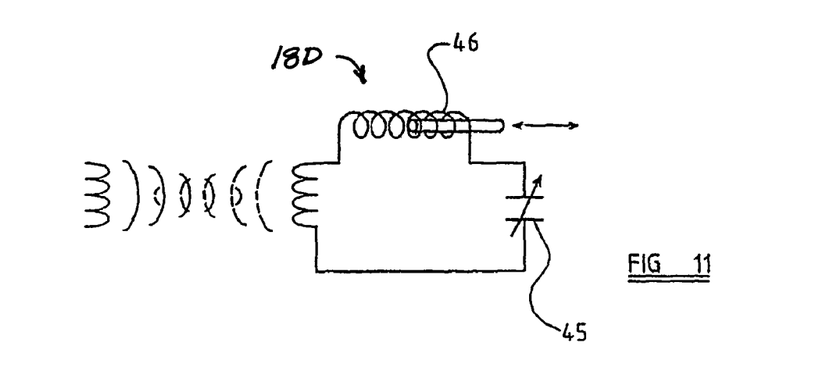
FIG. 11 is a view corresponding to FIG. 7 showing a further modification.

FIG. 11 illustrates a sensor circuit 18D which includes the inductor 17 and the capacitor 25, and also a variable inductor 46. The variable inductor may again be utilised where a variable signal is to be provided.

It is to be understood, therefore, that in the vehicle seat of the invention there is a resonant circuit, the resonant frequency of which varies in dependence upon the condition of the vehicle seat. In each of the embodiments described, the resonant circuit provided on the seat has no active components. The resonant circuits are therefore each passive.

While the above description constitutes the preferred embodiment of the present invention, it will be appreciated that the invention is susceptible to modification, variation and change without departing from the proper scope and fair meaning of the accompanying drawings.

The invention claimed is:

1. A sensor circuit for a removable seat for a motor vehicle, comprising the seat incorporates a first inductor to form part of an inductive coupling between the first inductor and a second inductor that is mounted to a floor of the motor vehicle forming a contactless-transmission arrangement extending between the seat and the floor of the motor vehicle, the first inductor forming part of a resonant circuit mounted to the seat which incorporates at least one capacitor and has a resonant frequency, the resonant frequency of the resonant circuit being variable in response to a sensed parameter, and a signal processing circuit for detecting between resonance conditions of the resonant circuit based on response to the sensed parameter, wherein the resonant circuit includes a switch associated with the at least one capacitor to switch the capacitor in and out of the resonant circuit in response to the sensed parameter, such that the resonant frequency of the resonant circuit depends upon the sensed parameter, the switch together with the capacitor incorporated in the part of the resonant circuit that is mounted to the seat and which is associated with the first inductor, wherein the signal processing circuit includes a signal generator and an analyser, wherein the signal generator is connected to a first side of the second inductor through a load, the second side of the second inductor being connected to the analyzer, the signal generator generating a first signal having a first frequency, a second signal being provided to the analyser from the second inductor, the second signal having a second frequency based on the first frequency and the resonant frequency of the resonant circuit, the analyser determining the resonant frequency based on the second frequency and identifying a sensed parameter based on the resonant frequency.

2. A sensor circuit according to claim 1 wherein the sensed parameter is the position of a height adjustable belt deflector.

3. A sensor circuit according to claim 1 wherein the sensor parameter is the position of a head-rest of the seat.

4. A sensor circuit according to claim 1 wherein the sensed parameter is the inclination of a back-rest of the seat.

5. A sensor circuit according to claim 1 wherein the sensed parameter is the condition of part of a seat-belt system.

6. A sensor circuit according to claim 5 wherein the sensed parameter is a condition of a seat-belt retractor.

7. A sensor circuit according to claim 5 wherein the sensed parameter is the condition of a safety-belt buckle.

8. A sensor circuit according to claim 1 wherein the sensed parameter is weight applied to a seat cushion of the seat.

9. A seat according to claim 1 wherein the resonant circuit incorporating a plurality of capacitors each with a respective switch to enable the capacitors to be switched individually in and out of the resonant circuit and wherein the respective switches responsive to one of a plurality of sensed parameters.

10. A sensor circuit according to claim 1 wherein the resonant circuit is a passive circuit which does not include an electrical power supply carried by the seat.

11. A sensor circuit according to claim 1 wherein the resonant circuit has two resonant frequencies depending upon the condition of the switch, and the signal generator and signal analyser is configured to generate the exciting signal such that the resonant circuit has resonant frequencies which are odd harmonics of the base frequency of the exciting signal.

12. A sensor circuit according to claim 1 wherein the signal generator and signal analyser is adapted to generate a plurality of exciting signals, each exciting signal having a different frequency which is one of a plurality of resonant frequencies of the resonant circuit.

13. A sensor circuit according to claim 1 wherein the signal generator and signal analyser is configured to generate successive exciting signals having different resonant frequencies.

14. A sensor circuit according to claim 1 wherein the signal generator and signal analyser is configured to generate the exciting signal during one period of time and analyse at least one of the transmitted signals during a succeeding period of time.

15. A sensor circuit according to claim 1 wherein the signal generator and signal analyser is configured to generate the exciting signal and analyse at least one of the transmitted signals simultaneously.

16. A sensor circuit according to claim 14 wherein the signal processing circuit is configured to take an average of the transmitted signals, and compare the phase of the average with the phase of the exciting signal.

* * * * *